United States Patent
Stiesdal

(10) Patent No.: US 7,808,126 B2
(45) Date of Patent: Oct. 5, 2010

(54) WIND FARM AND METHOD FOR CONTROLLING THE SAME

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 315 days.

(21) Appl. No.: 11/920,398

(22) PCT Filed: May 12, 2006

(86) PCT No.: PCT/EP2006/004823

§ 371 (c)(1), (2), (4) Date: Nov. 13, 2007

(87) PCT Pub. No.: WO2006/120033

PCT Pub. Date: Nov. 16, 2006

(65) Prior Publication Data

US 2009/0096211 A1    Apr. 16, 2009

Related U.S. Application Data

(60) Provisional application No. 60/680,812, filed on May 13, 2005.

(30) Foreign Application Priority Data

May 13, 2005 (EP) ................................. 05010542

(51) Int. Cl.
*H02J 1/00* (2006.01)
*H02J 3/00* (2006.01)
(52) U.S. Cl. .......................................... 307/84; 307/57
(58) Field of Classification Search .................. 307/80, 307/84; 290/44
See application file for complete search history.

(56) References Cited

U.S. PATENT DOCUMENTS 5,083,039 A    1/1992    Richardson et al.
6,323,618 B1   11/2001   Kitamura et al.

(Continued)

FOREIGN PATENT DOCUMENTS

DE    33 41 984 A1    5/1985

(Continued)

OTHER PUBLICATIONS

Y.A. Kazachkov et al, "Modeling Wind Farms for Power System Stability Studies", IEEE 2003, pp. 1526-1533.

(Continued)

*Primary Examiner*—Jared J Fureman
*Assistant Examiner*—Carlos Amaya

(57) ABSTRACT

A method for controlling dynamic power factor or the reactive power of a wind farm is provided. The wind farm comprises a number of wind turbines connected to a utility grid driven with a requested power factor or a requested reactive power. The wind turbine output voltage is controlled to a specific voltage set point. In the method, the wind farm power factor is measured and compared with the power factor requested for the utility grid, or the wind farm reactive power is measured and compared with the reactive power requested for the utility grid, respectively; the ratio of the wind farm voltage to the utility grid voltage is adjusted, and the output voltage of the individual wind turbines is regulated to correspond to the specific voltage set point; the steps are repeated until the power factor of the wind farm electricity corresponds to the requested reactive power.

13 Claims, 5 Drawing Sheets

U.S. PATENT DOCUMENTS 6,671,585 B2 * 12/2003 Lof et al. .................. 705/36 R
6,924,565 B2 * 8/2005 Wilkins et al. ................ 290/44

FOREIGN PATENT DOCUMENTS

EP        0 704 953 A2    4/1996

JP        02273035    11/1990

OTHER PUBLICATIONS

J. Vanden Keybus et al., "Using a fully digital rapid prototype platform in grid-coupled power electronics applications", IEEE 2004, pp. 102-111.

L. Holdsworth et al, "Direct solution method for initializing doubly-fed induction wind turbines in power system dynamic models", IEE Proc.-Gener. Transm.Distrib., vol. 150, No. 3, May 2003; p. 334-342.

* cited by examiner

WIND FARM AND METHOD FOR CONTROLLING THE SAME

CROSS REFERENCE TO RELATED APPLICATIONS

This application is the US National Stage of International Application No. PCT/EP2006/004823, filed May 12, 2006 and claims the benefit thereof. The International Application claims the benefits of European application No. 05010542.8 filed May 13, 2005, and the benefits of American application 60/680,812 filed May 13, 2005, all of the applications are incorporated by reference herein in their entirety.

FIELD OF INVENTION

The present invention relates to a wind farm comprising a number of wind turbines connected to a Utility grid, which is to be driven with a requested power factor or a requested reactive power, and to a method of Controlling the dynamic power factor or reactive power of the wind farm.

BACKGROUND OF THE INVENTION

Over the last decade the fraction of energy added to power grids by wind farms has increased significantly. Therefore, there is also an increased need for Controlling wind farms delivering energy to Utility grids with respect to a number of parameters which are important for the Utility grid to work faultlessly. In addition to the voltage and the frequency of the power delivered to the Utility grid, it may also be important to provide, on request of the Utility sys-tem Operator, a certain reactive power or a certain power factor. The reactive power is the power needed by inductive and capacitive users to build up their magnetic and electric fields, respectively. With an alternating current such magnetic and electric fields will be built up and down periodically, which leads to a reactive power flow from and to the electric generators. The power factor is the cosine of the phase angle between voltage and current.

Variations in the demand for reactive power in the Utility grid need to be compensated through reactive power provided by the power generators. As long as the power delivered to the Utility grids by wind farms was only a minor fraction of the total power delivered to the grids, there was no need to react to the reactive power demands or power factor demands of the grid by the wind farms. However, with increasing fraction of power fed into Utility grids by wind farms, the dynamic power factor control or a dynamic reactive power control of wind farms becomes more and more important.

Dynamic power factor control of wind farms is often implemented with capacitors banks mounted in individual wind turbines. Capacitors are switched on and off the grid to provide such reactive power as is required to meet the specified power factor. Dynamic power factor control may also be implemented by an arrangement where the individual wind turbines are equipped with a power electronic Converter that converts part or whole of the electricity supplied by the wind turbine. The power electronic Converter of the individual wind turbine is programmed to control the power factor of the electricity supplied by the wind turbine.

For both types of power factor control System the desired power factor is typically provided as a signal from a central SCADA (Supervise Control and JData Acquisition) System. The Utility System Operator dispatches a request to the wind farm for a certain power factor and the central SCADA System forwards the power factor request to the individual wind turbines, either directly or after modification, to compensate for the power factor contribution of the wind farm electrical infrastructure. The power factor is controlled locally at the individual wind turbines by adjustment of the power factor of the electricity supplied by the individual wind turbines to correspond to the power factor requested by the SCADA System. Such an arrangement for dynamic power control is, e.g., de-scribed in U.S. Pat. No. 5,083,039, which describes a wind turbine with dynamic power factor control, sending control signals to power electronic Converters of wind turbines. The power electronic Converters are then locally controlled such that the power factor delivered by the local wind turbine is shifted through changing the ratio of active and reactive current supplied to the grid by the inverter module of the power electronic Converter.

A dynamic power factor control system as outlined above requires a SCADA system with functional and fast-reacting connections to the individual wind turbines. If the individual communication of the wind farm is slow or deficient, the dynamic power control will not function faultlessly. Further, unless all turbines are operating at the same active power output, which will rarely be the case if the wind speed is not sufficiently high to cause all wind turbines of the farm to operate at rated capacity, the reactive power supplied by an individual wind turbine will change proportionally with the active power supplied by the individual wind turbine. This means that some wind turbines will provide significantly larger proportion of reactive power than others, which in turn leads to current flow in the wind farm that is less balanced and causes higher losses than what could be achieved with more balanced current flow.

L. Holdsworth, et al. describe "a direct solution method for initializing doubly-fed induction wind turbines in power system dynamic modeis" in EE Proc.-Gener. Trasm. Distrib., Vol. 150, No. 3, May 2003. In this model, the wind turbine is represented as a PQ bus. The model uses a control strategy of Optimum power extraction (speed control) and local power factor correction. The results of the direct solution method are the injected rotor voltages for Controlling the wind turbine. Moreover, a model in which the control strategy is modified to terminal voltage control is described. In a terminal voltage control, in contrast to power factor or control reactive power control, the output voltage of the wind farm is con-trolled to value requested by the utility System Operator.

SUMMARY OF INVENTION

It is a first objective of the present invention to provide an improved method Controlling the dynamic power factor or the reactive power of a wind farm.

It is second objective of the present invention to provide a wind farm which allows for improved control of the dynamic power factor or the reactive power.

The first objective is solved by a method Controlling the dynamic power factor or the reactive power of a wind farm comprising a number of wind turbines. The second objective is solved by a wind farm which comprises a number of wind turbines.

The invention defines a method of Controlling the dynamic power factor or the reactive power of a wind farm. The wind farm comprises a number of wind turbines connected to a utility grid which is to be driven with a requested power factor or requested reactive power. The Output voltage of the electricity supplied by an individual wind turbine of the wind farm is controlled to a specific voltage set point. In the inventive method the wind farm power factor or the wind farm reactive power is measured and compared with the power factor requested for the utility grid or the reactive power requested for the utility grid, respectively, and the ratio of the wind farm voltage to the utility grid voltage is adjusted. Further, the output voltage of the individual wind turbines is regulated to correspond to the specific voltage set point. At least the Steps of adjusting the ratio of the wind farm voltage to the utility grid voltage and of regulating the output voltage of the individual wind turbines to the specific voltage set point are performed until the power factor or the reactive power of the electricity supplied by the wind farm corresponds to the requested power factor or the requested reactive power, respectively.

Upon a change of the ratio of the wind farm voltage to the utility grid voltage, each wind turbine will automatically regulate the voltage of the wind turbine to match the preset voltage. This regulation is done by varying the ratio of active power to reactive power delivered by the individual wind turbine. This changes of the ratios of reactive power to active power at the individual wind turbine collectively changes the ratio of reactive power to active power of the electricity supplied by the wind form. This continues until the desired power factor or reactive power, respectively, is reached.

It should be noted, that measuring the wind farm power factor and comparing it with the requested power factor or of measuring the wind farm reactive power and comparing it with the requested reactive power, respectively, may also be repeated when repeating the adjustment of the ratio of the wind farm voltage to the Utility grid voltage and the regulation of the Output voltage of the individual wind turbines. Further, the Steps may be repeated in discrete steps or continuously until the power factor of the electricity supplied by the wind farm corresponds to the requested power factor, or the reactive power of the electricity supplied by the wind farm corresponds to the requested reactive power, respectively.

The inventive method has the following advantages:

1. The dynamic power factor control is independent of a SCADA System and its functional and fast-reacting connections to the individual wind turbines. Even if the internal communication of the wind farm is slow or deficient, the dynamic power factor control or the reactive power control according to the inventive method is unaffected.

2. Since all wind turbines are operating at the same Output voltage, the reactive power supplied by an individual wind turbine does not change nearly as strongly with the active power supplied by the individual wind turbine as in the power factor control Systems known from the State of the art. This means that most turbines in the wind farm will provide reactive power within a certain range that is not as broad as in the case of power factor regulation implemented at the individual wind turbine level. The inventive method, therefore, will allow a better balanced current flow in the wind farm, leading to lower infrastructure losses.

3. A utility System Operator may either specify desired values of power factor or reactive power. In principle, he may also specify desired values of the voltage.

For the step of adjusting said ratio of the wind farm voltage to the utility grid voltage a main transformer tap may be used. However, a utility System Operator might desire a more precise regulation of the power factor than can be achieved by incremental, or stepwise, adjustment of the ratio of the wind farm voltage to the utility grid voltage by means of the main transformer tap changer. Such more precise regulation can be achieved if the ratio of the wind farm voltage to the utility grid voltage is additionally adjusted by the use of a supplementary dynamic power factor control, e.g. in the form of an adjustable capacitor bank.

If the individual wind turbines are equipped with power electronic Converters that convert part or the whole of the electricity supplied by the wind turbine, the power electronic Converters of the individual wind turbines can be programmed to control the output voltage of the electricity supplied by their wind turbines to said specific voltage set point and to regulate the Output voltage of their wind turbine to correspond to said specific voltage set point. As in many wind farms variable speed wind turbines are used and the variable speed wind turbines are usually equipped with power electronic Converters, this implementation of regulating the Output voltage of an individual wind turbine to a voltage set point can be achieved with relatively small effort.

The inventive method allows for more flexibility if the voltage set point to which the Output voltage of the individual wind turbines is regulated is adjustable.

An inventive wind farm with a number of wind turbines for being collectively connected to a utility grid comprises individual wind turbines equipped with a power electronic converter for converting part or the whole of the electricity supplied by the wind turbine. The power electronic Converters are equipped with Controllers programmed for Controlling the output voltage of the electricity supplied by the wind turbine to a specific voltage set point. It further comprises means for measuring the wind farm power factor or the wind farm reactive power and comparing it with a requested power factor or a requested reactive power, respectively. In addition, it comprises adjusting means for adjusting the ratio of the wind farm voltage to the Utility grid voltage. The individual wind turbines are equipped with regulating means which are programmed for regulating the output voltage at the individual wind turbine to correspond to the specific voltage set point.

The inventive wind farm is designed to perform the inventive method of Controlling the dynamic power factor or the reactive power of the wind farm. In the inventive wind farm, the requested power factor or the requested reactive power, respectively, does not need to be communicated to the Controllers of the power electronic Converters of the individual wind turbines. Only an adjustment signal for adjusting the ratio of wind farm voltage to the utility grid voltages needs to be communicated to the wind farm at, e.g., a substation level. Upon a change of the ratio of the wind farm voltage to the utility grid voltage, the output voltage of the individual wind turbines changes as well. The regulating means in the Controllers of the power electronic Converters then regulates the output voltage of each wind farm to correspond to the specific voltage set point. However, this regulation is done at a local level at the wind farm so that a communication of control Signals from a central SCADA System to the power electronic Converters is not necessary. This reduces the requirements which need to be met by the connections between the SCADA System and the Controllers of the power electronic Converters, in particular in terms of communication speed of the connections.

In a further development, the wind farm comprises a substation connecting it to the Utility grid. The substation includes a substation Controller or is connected to a substation Controller. The substation Controller is connected to the measuring means for receiving difference Signals representing a deviation of the wind farm power factor from the requested power factor, or a deviation of the wind farm reactive power from the requested reactive power, respectively, and to the adjusting means for outputting an adjustment signal. It is programmed to establish the adjustment signal on the basis of the received difference signal. This development allows for regulating the ratio of the wind farm voltage to the Utility grid voltage to a specific ratio set point.

The substation Controller may be programmed to iteratively establish adjustment signals on the basis of successively received difference Signals. By iteratively establishing adjustment signals, stepwise changes in the ratio of the wind farm voltage to the utility grid voltage can be kept relatively small so that the regulation of the Output voltage in the individual wind turbines also requires only small steps.

As the adjustment means for adjusting the ratio of the wind farm voltage to the utility grid voltage, a main transformer with at least to taps and a tap changer may be used. However, the utility system Operator might desire more precise regulation of the power factor than can be achieved by the incremental, or stepwise, adjustment of the ratio of the wind farm voltage to the utility grid voltage by means of the main transformer tap change. More precise regulation can be achieved by the addition of a supplementary dynamic power factor control system, e.g. in the form of an adjustable capacitor bank. The reactive power capacity of the supplementary dynamic power factor control System should advantageously correspond to the change in reactive power delivered from the wind farm, which results from the change in the ratio of the wind farm voltage to the Utility grid voltage caused by one tap change at the main transformer. This allows for a more continuous Variation of power factor or reactive power over the whole range provided by the main transformer.

The power electronic Converters of the individual wind turbines may comprise an inverter with an inverter input which is connected to a DC link of the power electronic Converter and an inverter output which is connected—either directly or indirectly—to the substation. It then further comprises an inverter Controller which is programmed for Controlling the output of the inverter to said specific voltage set points. This allows for using the power electric Converter to regulate the output voltages of the wind turbine to said specific voltage set point, i.e. to serve as the regulating means for regulating the output voltage of the individual wind turbine to correspond to said voltage set point. In particular, the inverter may comprise a number of Switches connecting an inverter input to an inverter output. The Controller then comprises:

A voltage measurement unit connected to the inverter output for measuring the output voltage of the inverter and for producing a voltage signal representing the measured output voltage, a memory storing said voltage set point, a comparator unit being connected to the voltage measurement unit for receiving the voltage signal and being connected to the memory for receiving the voltage set point, the comparator unit being designed for comparing the output voltage to said voltage set point and for reproducing a deviation signal representing the deviation of the measured voltage from said voltage set point, a processing unit connected to the comparator unit for receiving the deviation Signal, which is programmed to establish a modulation signal representing a pulse width modulation of commutation Signals for the switches on the basis of the deviation signal, and a pulse with modulation unit connected to the processing unit for receiving the modulation signal, the modulation unit being designed for modulating the pulse width of commutation Signals and being connected to the switches for outputting pulse with modulated commutation Signals to them.

By outputting pulse width modulated commutation Signals to the switches, the desired Output voltage at the individual wind turbine can be set to correspond to said specific voltage set point.

To allow for an adjustment of the voltage set point, the wind farm may comprise a set point adjustment unit. This unit is connected to the substation for receiving a set point signal representing a certain value for said voltage set point from the sub Station and to the regulation means of individual wind turbines, e.g. to the inverter Controllers of power electric Converters, for delivering a set point signal to them which causes the voltage set point to be adjusted to the value represented by the set point signal. By such an adjustment unit, the Operation of the wind farm can be adjusted to a broad a range of conditions.

BRIEF DESCRIPTION OF THE DRAWINGS

Further features, properties and advantages of the present invention will be clear from the following description of embodiments of the invention with reference to the accompanying points.

DETAILED DESCRIPTION OF INVENTION

Figure 1:
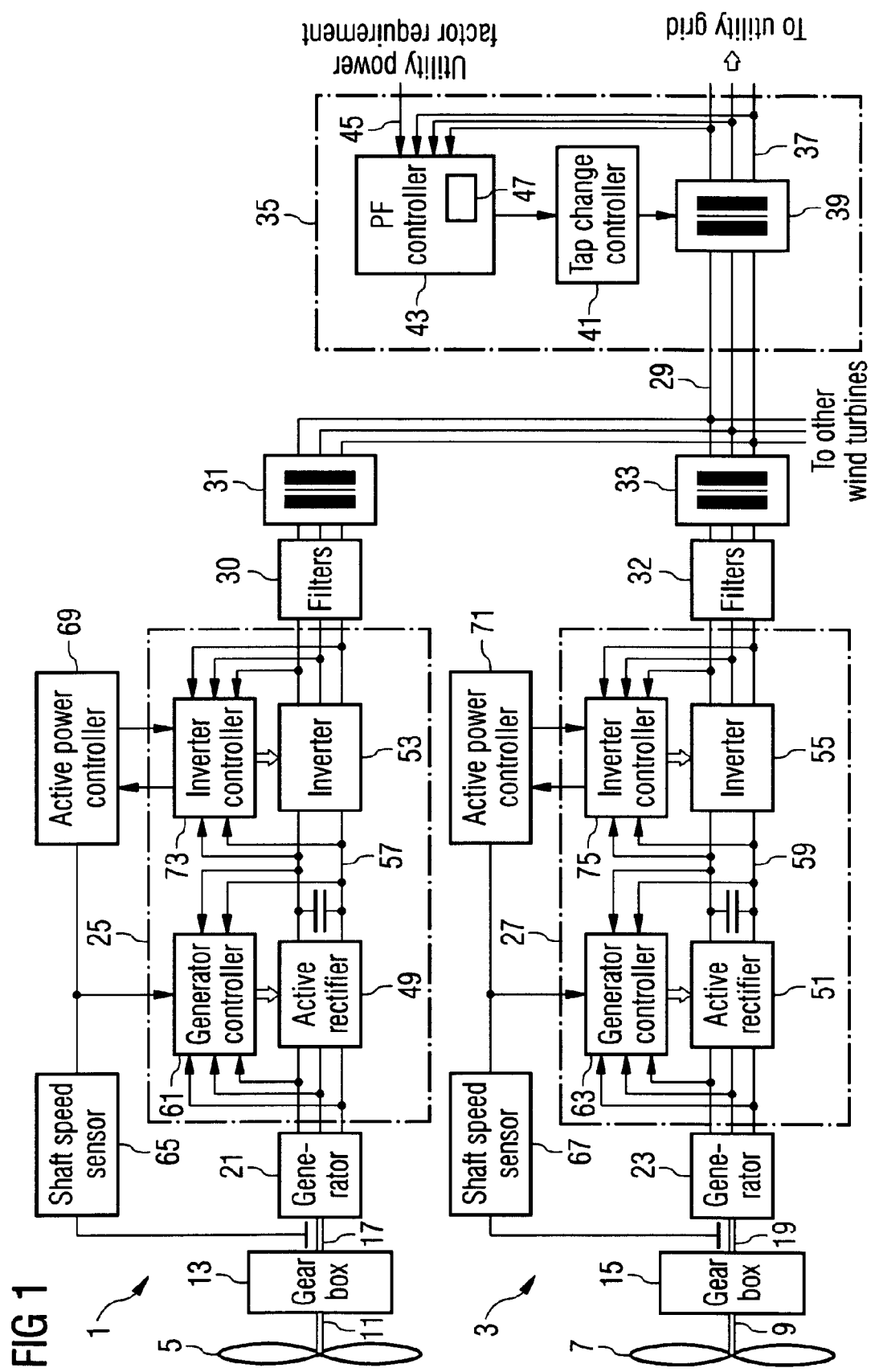
FIG. 1 shows a wind farm arrangement for carrying out a power factor control according to the invention.

FIG. 1 shows a wind farm arrangement for carrying out a power factor control according to the invention. The wind farm is indicated by two wind turbines 1, 3, each comprising a rotor with a rotor shaft transmitting the rotational momentum of the turning rotor 5, 7 to a gear box 13, 15. In the gear box 13, 15, a transmission of the rotation to an output shaft 17, 25 19 with a certain transmission ratio takes place.

The output shaft 17, 19 is fixed to the rotor of an AC generator 21, 23 which transforms the mechanical power provided by the rotation of the output shaft 17, 19 into the electrical power. The AC generator may either be a synchronous generator or an asynchronous generator. In a synchronous generator, the rotor rotates with the same rotational frequency as a rotating magnetic field produced by a stator of the generator. In contrast, in an asynchronous generator, the rotational frequencies of the stator's magnetic field and the rotor are different. The difference in rotational frequency is described by the slip of the generator. The generators 21, 23 are variable speed generators, i.e. the rotational speed of the rotor is allowed to vary depending on the wind conditions.

To provide a fixed frequency for the Utility grid to which the wind turbines are connected, each wind turbine 1, 3 is equipped with a power electronic Converter 25, 27 which converts parts or the whole of the varying frequency electricity delivered by the generators 21, 23 into an electrical power having a fixed frequency which is adapted to the Utility grid. In addition, the power electronic Converters 25, 27 control the Output voltage of the electricity supplied by the wind turbine to correspond to a specific voltage set point. Details of the power electric Converters 25, 27 will be explained later.

The individual wind turbines 1, 3 are connected to an internal grid 29 with an intermediate voltage through filters 30, 32 and transformers 31, 33. The internal grid 29 is connected, via a substation 35, to a utility grid which is to be operated with a certain power factor requested by the utility System Operator. The wind farm, which is schematically shown in FIG. 1, is to be operated with power factor control, i.e. the wind farm delivers a certain power factor on request by the utility system Operator.

With the inventive wind farm and the inventive method the power factor supplied to utility grid can be controlled at the sub Station level by a combination of a voltage control at the individual wind turbines of the wind farm, voltage control at the substation and, as an Option, a capacitor bank. Based upon a change of the ratio of the wind farm voltage to the utility grid voltage, the individual wind turbine invertors will automatically regulate the ratio of active and reactive power supplied by the inverter to maintain the out-put voltage defined by the voltage set point while, at the same time, supplying the active power defined by the active power Controller. The change of the ratio of active to reactive power at the individual inverter level will collectively change the power factor of the electricity supplied by the wind farm. Accordingly, the power factor of the electricity supplied by the wind farm can be regulated to match the power factor requested by the Utility System Operator based upon the change of the reactive power Output from the individual inverters, i.e. from the individual wind turbines, resulting from changes of the ratio of the wind farm voltage to the Utility grid voltage, and the reactive power supplied by the power factor control system.

When the Utility system Operator dispatches a request to the wind farm for a certain power factor the wind farm power factor is measured at the substation level and compared with the power factor requested by the Utility system Operator. Then, the ratio of the wind farm voltage, at the sub Station's 35 Output 37, to the utility grid voltage is adjusted at the sub Station 35 level. This change of the ratio of the wind farm voltage to the utility grid voltage causes a change of the Output voltage at the individual wind turbines. Therefore, the Output voltage at the individual wind turbines is regulated by the power electronic Converters 25, 27 to correspond again to the specific voltage set point. The adjustment of the ratio of the wind farm voltage to the utility grid voltage and the regulation of the individual wind turbines Output voltages so as to correspond to the specific voltage set point is continued until the power factor of the electricity supplied by the wind farm corresponds to the power factor requested to the utility system Operator.

Adjusting the ratio of the wind farm voltage to the utility grid voltage is done by means of a main transformer 39 of the substation 35. Therefore, the substation 35 comprises a tap changer which allows for changing the voltage Output by the main transformer 39. By changing the voltage, the inductance of the transformer also changes, which in turn changes the phase angle between the voltage and the current supplied by the wind farm to the Utility grid. As a consequence, the power factor changes, too. Note that the power factor is the ratio of the reactive power supplied by the wind farm to the square root of the Square of the active power plus the Square of the reactive power supplied by the wind farm. A power factor of one means that no reactive power is present and the supplied power contains only active power and corresponds to a phase difference between the voltage and the current of zero degrees, since the power factor is given by the cosine of the phase difference between the voltage and the current. On the other hand, a phase different of 90°, i.e. a power factor of zero, means that only reactive power is delivered to the utility grid by the wind farm.

The substation 35 further comprises a tap change Controller 41 acting on the tap changer of the main transformer 39 and a power factor Controller 43 acting on the tap change Controller 41. The power factor Controller 43 receives the request for a certain power factor by the utility system Operator through an input line 45. The power factor Controller 43 includes a measurement unit 47 which is connected to the substation's Output 37 for measuring the phase difference between the Output voltage and the Output current of the wind farm. Based on the measured phase difference, the power factor Controller 43 establishes the actual power factor of the electricity supplied by the wind farm and compares it to the power factor requested by the utility Operator through the input line 45. On the basis of the difference between a requested power factor and the actual power factor of the wind farm, the power factor control signal is established and delivered to the tap change Controller 41. The tap change Controller 41 then determines a ratio of the wind farm voltage to the utility grid voltage which produces a power factor coming closest to the requested power factor. By setting the according tap the ratio is adjusted. The adjustment may be done stepwise or in a continuous process. The adjustment of the ratio of the wind farm voltage to the Utility grid voltage by means of the main transformer's tap changer leads to a change of the voltage in the internal grid 29 and, in turn, to a change of the voltage at the Output of the power electric Converters 25, 27. However, as the power electronic Converters 25, 27 are programmed to control the output voltages of the electricity supplied by the respective wind turbines to correspond to a specific voltage set point, the adjustment of the ratio of the wind farm voltage to the Utility grid voltage results in a regulating action of the power electronic Converters 25, 27 for regulating the Output voltages at the individual wind turbines until the voltage output by the power electronic Converter corresponds again to the voltage set point.

After the output voltages of the individual wind turbines have been regulated to correspond again to the specific voltage set point, the wind farm power factor is measured again and compared again with the power factor requested by the utility System Operator. When the difference between the wind farm power factor and the request power factor is small enough, i.e. is smaller than a preset deviation, the method is finished. When the difference is not small enough, i.e. is bigger than the preset maximum deviation, the ratio of the wind farm voltage to the utility grid voltage is adjusted again by means of the main transformer's 39 tap changer, and the output voltages at the individual wind turbine are regulated again by the power electronic Converters 25, 27 to correspond to the specific voltage set point. This procedure is repeated as long as the measured difference between the wind farm power factor and the requested power factor is bigger than the allowed maximum deviation anymore.

Although the control of the dynamic power factor, as described above, is performed iterative i.e. stepwise with reducing the difference between the wind farm power factor and the requested power factor in each step, it may also be per-formed continuously, if the substation 35 allows for continuously varying the wind farm voltage at the substation Output 37.

The regulation of the Output voltage of the electricity supplied by the wind turbines will be described next. The Output voltage is controlled by the power electronic Converters 25, 27 of the individual wind turbines 1, 3. The power electronic converters 25, 27 each comprise an active rectifier 49, 51 for producing a DC voltage from the variable frequency AC voltage provided by the wind turbines, an inverter producing a fixed frequency AC voltage from the DC voltage, and a DC link 57, 59 connecting the active rectifier 49, 51 with the inverter 53, 55. Each power electronic Converter 25, 27 further includes a generator Controller 61, 63 which controls the torque reacted by the generator 21, 23 by Controlling the stator current or stator voltage of the generator 21, 23.

The control signal Output to the active rectifier 49, 51 is established on the basis of the desired power to be provided to the grid, the voltage of the DC link and the shaft speed of the rotor.

The inverter Controller 73, 75 receives the voltage level on the DC link 57, 59 and the voltage level at the inverter out-put. It further receives an active power control signal from an active power Controller 69, 71, which controls the active power, Output by the power electronic Converters 25, 27, to a requested active power. Moreover, the inverter Controller 73, 75 controls the Output voltage of the inverter 53, 55 to a preset voltage set point. The active power and the voltage are controlled by means of pulse width modulated commutation signals for active Switches of the inverter 53, 55.

Figure 2:
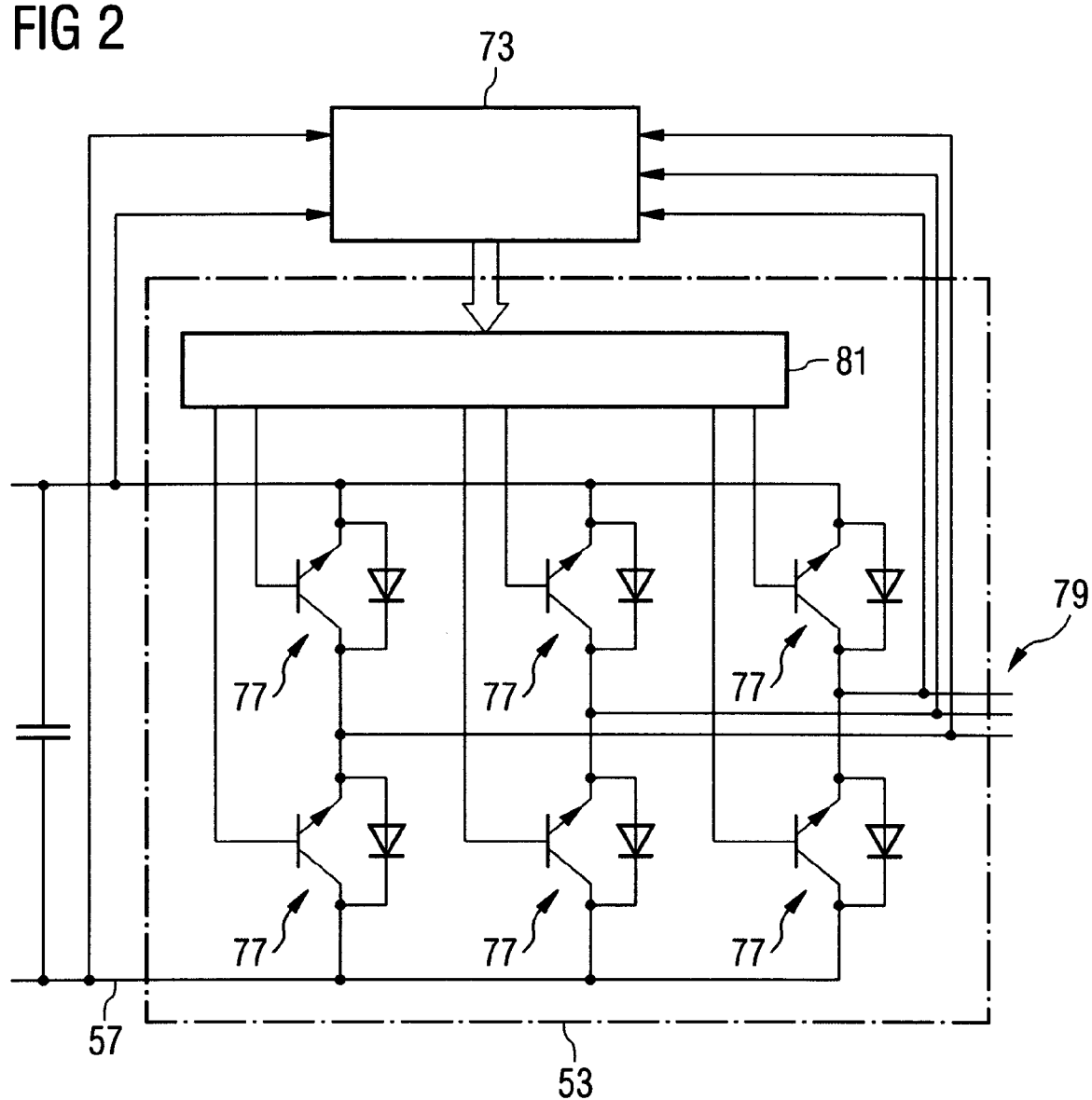
FIG. 2 shows the structure of an inverter of an individual 5 wind turbine.

The structure of the inverter 53 is shown in FIG. 2 in greater detail. It comprises three pairs of active switching devices 77, like isolated gate bipolar transistors (IBT), bipolar junction transistors, field effect transistors, darlington transistors or gate turn-off thyristors. In the pre-sent embodiment, each pair of active switching devices 77 includes two isolated gate bipolar transistors as active switching devices 77. The pairs of active switching devices 77 are connected between the two lines of the DC link 57. The three lines of the inverter output 79 are each connected to a different one of the pairs of active switching devices 77, in the middle between the switching devices 77.

By a suitable switching of the active switching devices 77 the DC voltage on the voltage link 57 can be transformed into a three-phase alternating voltage at the inverter output 79. The switching is done according to pulse width modulated commutation Signals which are supplied to the active switching devices 77 by the inverter Controller 73 through a drive circuit 81. The pulse width modulated commutation Signals are established such by the Converter Controller 73 that the active power at the inverter output 79 corresponds to a re-quested active power and that the voltage at the inverter output 79 corresponds to the preset voltage set point or is regulated by the preset voltage set point.

Figure 3:
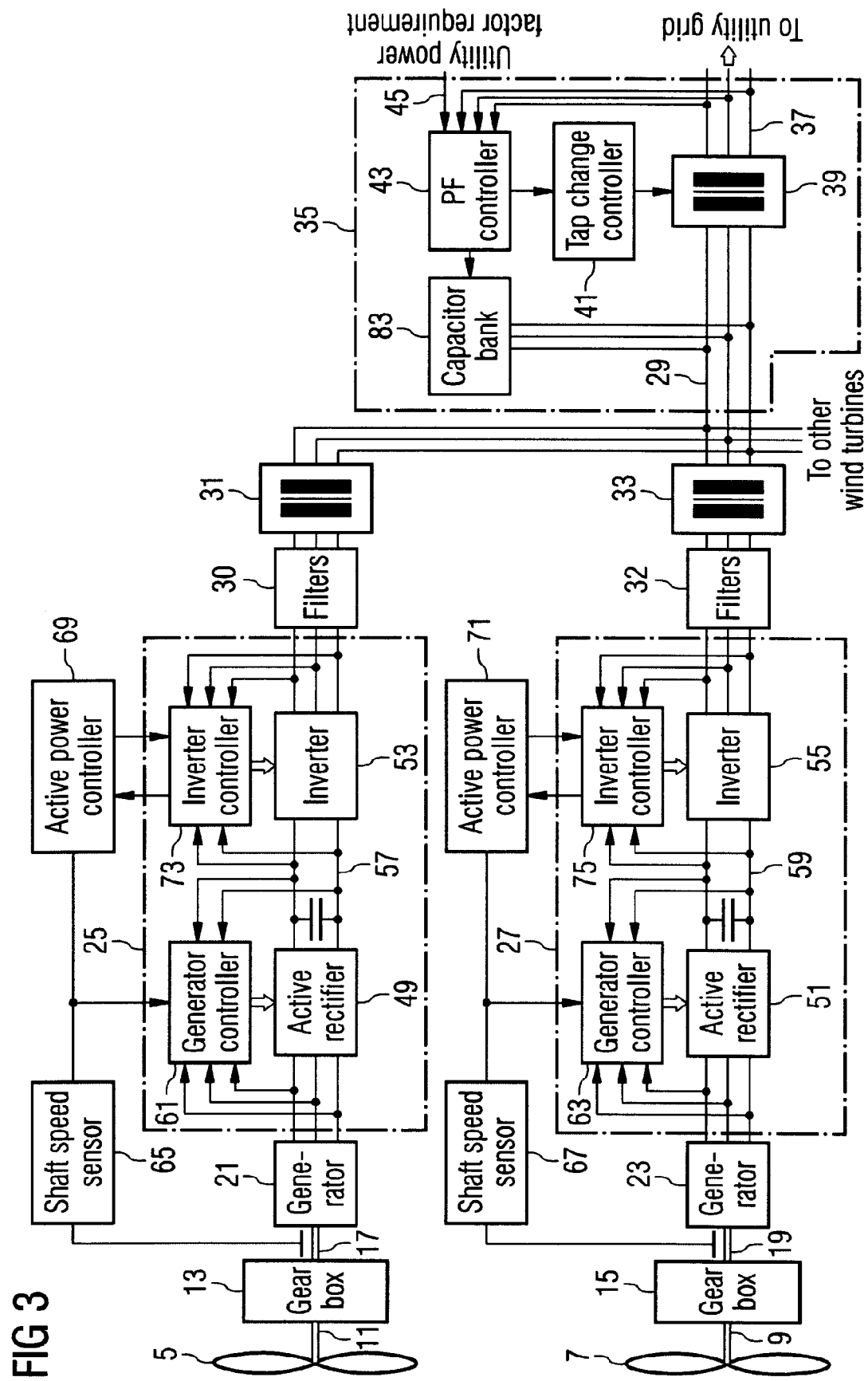
FIG. 3 shows a wind farm arrangement for carrying out a power factor control according to the invention, including a supplementary dynamic power factor control System.

A second embodiment of the wind farm is shown in FIG. 3. The wind farm of the second embodiment corresponds to the wind farm of the first embodiment except for a capacitor bank 83 which is provided in the sub Station 35. Like the tap change Controller 41, the capacitor bank is controlled by the power factor Controller 43. The adjustable capacitor bank 83 constitutes a supplementary dynamic power factor control System which allows a more precise regulation of the power factor than can be achieved by a stepwise adjustment of the ratio of the wind farm voltage to the Utility grid voltage by means of the main transformer's 39 tap changer. As already described, with the main transformer's 39 tap changer the ratio of the wind farm voltage to the Utility grid voltage is adjusted stepwise until the wind farm power factor comes close enough to the requested power factor. With the supplementary power factor control System, i.e. with the adjustable capacitor bank 83, the power factor achieved with the last Iteration by the tap changer can be brought even closer to the requested power factor. In addition, if the wind farm power factor only differs slightly from the requested power factor the wind farm power factor could be regulated by the supplementary power factor control system, alone.

Figure 4:
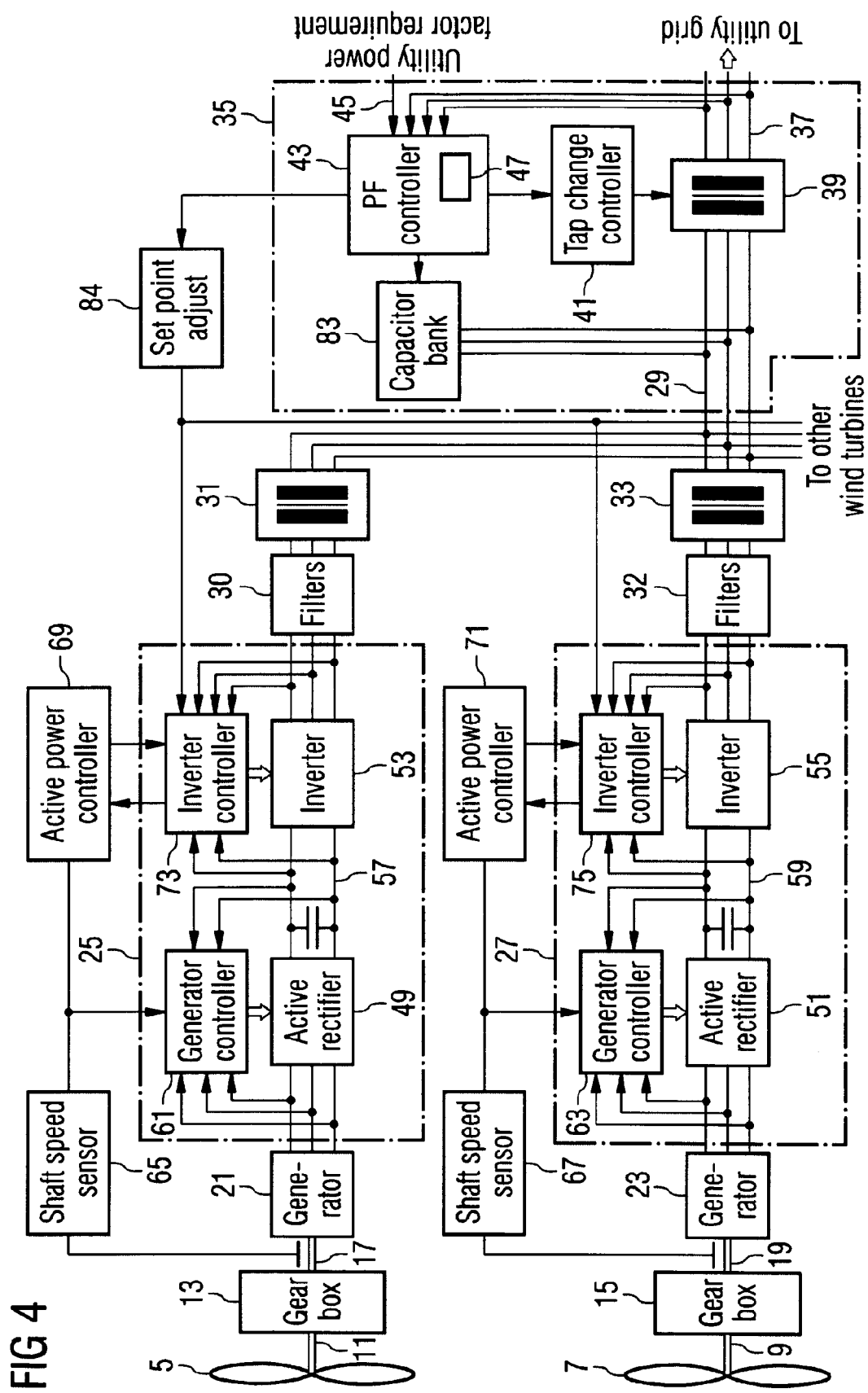
FIG. 4 shows a wind farm arrangement for carrying out a power factor control according to the invention, with an adjustment unit for adjusting the voltage set point of the individual wind turbines.

A still further embodiment of the wind farm is shown in FIG. 4. This wind farm corresponds to the wind farm shown in FIG. 3 except for an additional set point adjustment unit 84 which receives adjustment Signals from the power factor Controller 43 and sets, on the basis of the received adjustment signal, the voltage set point at the inverter Controllers 73, 75. In contrast thereto, the voltage set point is permanently programmed in the inverter Controllers of the first two embodiments.

All embodiments of the inventive wind farm have been de-scribed on the basis of receiving a power factor request from the input line 45. However, the power factor Controller could be replaced by a reactive power Controller. In this case, the reactive power Controller would receive a reactive power request through the input line 45. With this Variation of the described embodiments, the reactive power output by the wind farm could be controlled in the same way as the wind farm power factor was controlled in the first two embodiments.

Figure 5:
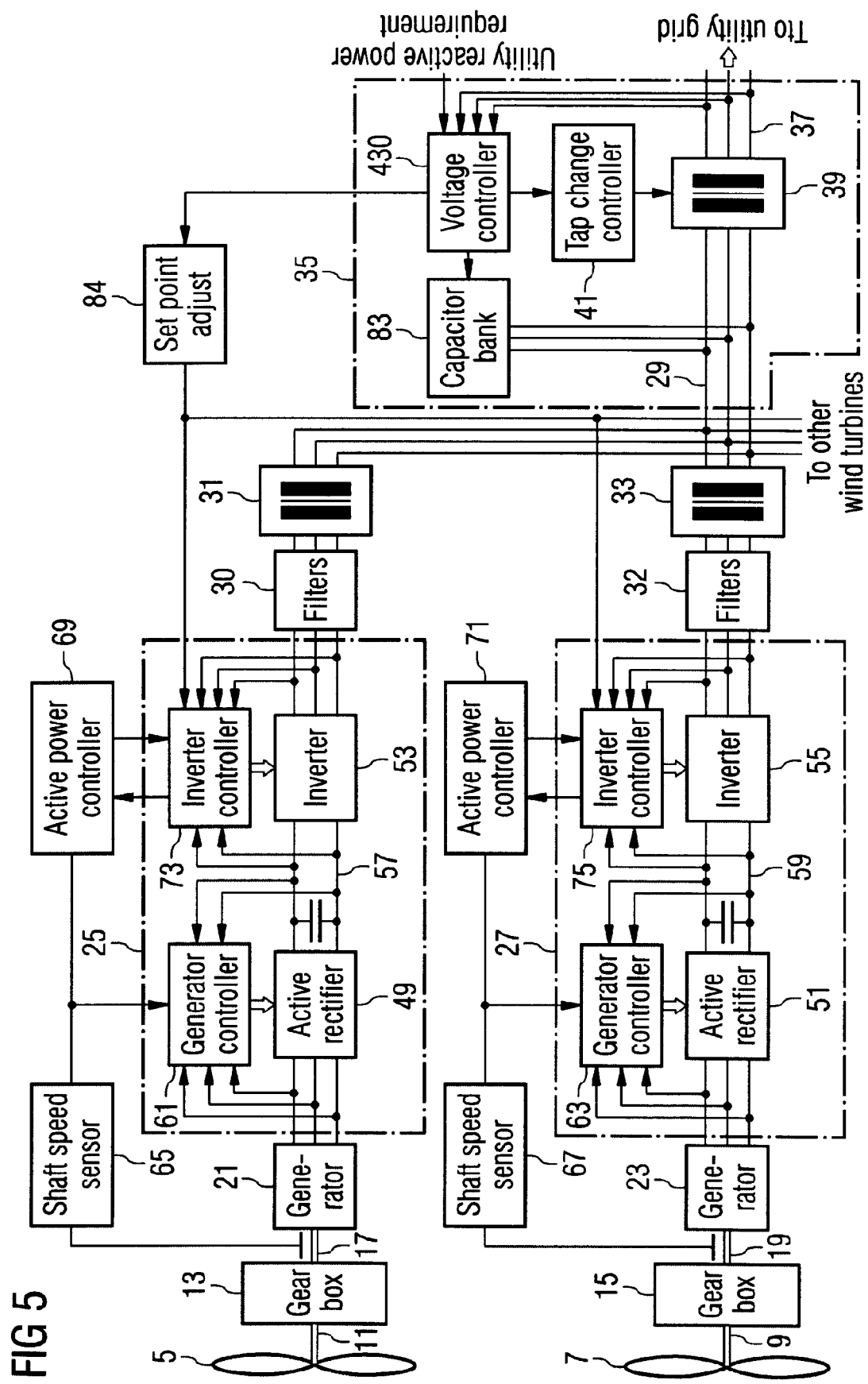
FIG. 5 shows a wind farm arrangement for carrying out a voltage control of the wind farm.

In principle, by replacing the power factor Controller 43 through a voltage Controller 430 (see FIG. 5), a voltage control of the wind farm could be realized with the described method.

Although only two wind turbines are shown in the embodiments, the wind farm would typically include a larger number of wind turbines, with each of wind turbine including a power electronic Converter for converting variable frequency electricity generated by the wind turbine generator into fixed frequency electricity.

The invention claimed is:

1. A method of controlling the dynamic power factor or the reactive power of a wind farm having a plurality of wind turbines connected to a utility grid driven with a requested power factor or a requested reactive power, the output voltage of the electricity supplied by an individual wind turbine controlled to a specific voltage set point, comprising:
   storing the voltage set point in memory;
   measuring and comparing the wind farm power factor with the power factor requested for the utility grid, or measuring and comparing the wind farm reactive power with the reactive power requested for the utility grid;
   adjusting the ratio of the wind farm voltage to the utility grid voltage;
   regulating the output voltage of the individual wind turbines to correspond to the specific voltage set point, the regulating, comprising:
      comparing a measured voltage signal with the voltage set point,
      producing a deviation signal, wherein the deviation signal represents a deviation of a measured voltage signal from the voltage set point,
      establishing a modulation signal using the deviation signal,
      outputting the modulation signal to a plurality of inverter switches thereby controlling the output voltage,
   repeating the adjusting and regulating until the power factor of the electricity supplied by the wind farm corresponds to the requested power factor or the reactive power of the electricity supplied by the wind farm corresponds to the requested reactive power.

2. The method as claimed in claim 1, wherein the ratio of the wind farm voltage to the utility grid voltage is adjusted via a main transformer tap.

3. The method as claimed in claim 2, wherein the ratio of the wind farm voltage to the utility grid voltage is additionally adjusted via a supplementary dynamic power factor control system.

4. The method as claimed in claim 3, wherein the ratio of the wind farm voltage to the utility grid voltage is additionally adjusted via an adjustable capacitor bank.

5. The method as claimed in claim 4, wherein individual wind turbines are equipped with a power electronic converter at converts at least a portion of the electricity supplied by the wind turbine, and the power electronic converter is programmed to control the output voltage of the electricity supplied by an individual wind turbine to the specific voltage set point and regulate the output voltage of the individual wind turbines to correspond to the specific voltage set point.

6. The method as claimed in claim 5, wherein the method steps are repeatedly performed in discrete steps until the power factor of the electricity supplied by the wind faun corresponds to the requested power factor or the reactive power of the electricity supplied by the wind farm corresponds to the requested reactive power.

7. The method as claimed in claim 6, wherein the voltage set point is adjustable.

8. A wind farm with a plurality of wind turbines for collectively connecting to a utility grid, comprising:

a power electronic converter assigned to an individual wind turbine for converting at least a portion of the electricity supplied by the wind turbine, the power converter having a controller programmed for controlling the output voltage of the electricity supplied by the wind turbine to a specific voltage set point, the power electronic converter comprises:

an inverter having an inverter input and an inverter output, the inverter input connected to a DC link of the power electronic converter and the inverter output connected to a substation and wherein the inverter comprises a plurality of switches connecting the inverter input to the inverter output, and an inverter controller programmed for controlling an output voltage of the inverter to the specific voltage set point, the inverter controller comprises:

a voltage measurement unit connected to the inverter output for measuring the output voltage of the inverter and for producing a voltage signal representing the measured output voltage, a memory that stores the voltage set point, a comparator unit connected to the voltage measurement unit for receiving the voltage signal and connected to the memory for receiving the voltage set point, the comparator unit designed for comparing the output voltage to the voltage set point and for producing a deviation signal that represents the deviation of the measured voltage from the voltage set point, a processing unit connected to the comparator unit for receiving the deviation signal programmed to establish a modulation signal representing a pulse width modulation of commutation signals for the switches based on the deviation signal, and a pulse width modulation unit connected to the processing unit for receiving the modulation signal, the pulse width modulation unit designed for modulating the pulse width of commutation signals and connected to a drive circuit of the switches for outputting pulse width modulated commutation signals, a measuring device configured to measure the wind farm power factor or the wind farm reactive power;

a comparing device configured to compare the measured wind farm power factor or the wind farm reactive power with a requested power factor or the requested reactive power;

an adjusting device that adjusts the ratio of the wind farm voltage to the utility grid voltage; and the substation that connects the wind farm to the utility grid, the substation having a substation controller connected to or including the measuring device for receiving a difference signal representing the deviation of the wind farm power factor from the requested power factor or the deviation of the wind farm reactive power from the requested reactive power, respectively, and to the adjusting device for outputting an adjustment signal, the substation controller programmed to iteratively establish an adjustment signal based on the received difference signal.

9. The wind farm as claimed in claim 8, wherein the adjustment device comprises a main transformer having a plurality of taps and a tap changer.

10. The wind farm as claimed in claim 9, wherein the adjustment device further comprises a supplementary dynamic power factor control system.

11. The wind farm as claimed in claim 10, wherein the dynamic power factor control system comprises a variable capacitor bank.

12. The wind farm as claimed in claim 11, wherein a capacity of the supplementary dynamic power factor control system corresponds to a change in reactive power from the wind farm resulting from a change in the ratio of the wind farm voltage to the utility grid voltage caused by one tap change at the main transformer.

13. The wind farm as claimed in claim 8, further comprising a set point adjustment unit connected to the substation for receiving a set point signal representing a certain value for the voltage set point from the substation and further connected to the power electric converter of the individual wind turbines for delivering a setting signal to the power electric converter causing the voltage set point to be adjusted to the value represented by the set point signal.

* * * * *